United States Patent [19]

Barnsdale

[11] 4,046,181

[45] Sept. 6, 1977

[54] INSERT

[76] Inventor: Arthur Derrick Barnsdale, Alne Cote, Great Alne, Warwickshire, England

[21] Appl. No.: 703,425

[22] Filed: July 8, 1976

[51] Int. Cl.² ............................................. F16B 15/06
[52] U.S. Cl. .................................... 151/41.73; 85/21
[58] Field of Search ................... 151/41.73; 85/32 K, 85/21, 22, 19, 20, 44

[56] References Cited

U.S. PATENT DOCUMENTS

| | | | |
|---|---|---|---|
| 2,949,142 | 8/1960 | Sumerak | 151/41.73 |
| 3,473,433 | 10/1969 | Mayr | 85/21 |
| 3,530,921 | 9/1970 | Ernest | 151/41.73 |
| 3,889,733 | 6/1975 | Leitner | 151/41.73 |

FOREIGN PATENT DOCUMENTS

| | | | |
|---|---|---|---|
| 487,967 | 6/1938 | United Kingdom | 85/32 K |
| 844,644 | 8/1960 | United Kingdom | 85/19 |
| 1,077,044 | 7/1967 | United Kingdom | 151/41.73 |
| 1,314,731 | 4/1973 | United Kingdom | 151/41.73 |
| 1,326,746 | 8/1973 | United Kingdom | 151/41.73 |

*Primary Examiner*—Marion Parsons, Jr.

*Attorney, Agent, or Firm*—Watson, Cole, Grindle & Watson

[57] ABSTRACT

An insert for installation in a hole therefor in a parent material by relative axial movement of the insert and material with or without the aid of heat, such as by high frequency vibration, wherein the insert has a series of external uniform diameter annular peripheral taper portions each tapering down towards the leading end of the insert and longitudinally serrated to provide projections for barb-like retention of the insert in the hole; and a reduced diameter pilot portion at the leading end of the insert having an external lip of substantially less diameter than that of the taper portions, which lip engages the hole in order to assist initial axial alignment and contact of the insert with the hole at the commencement of installation of the insert therein. The insert also has a rear plain external annular peripheral taper portion behind the rearmost serrated taper portion and of substantially the same diameter thereof and also tapering down towards the leading end of the insert in order to close the hole and retain parent material therein on complete installation of the insert.

2 Claims, 5 Drawing Figures

INSERT

BACKGROUND OF THE INVENTION

This invention relates to inserts of the kind which have a serrated or similarly formed exterior to provide a plurality of projections for retention of the insert in a hole therefore in a parent material and which are installed in position of use in a hole by relative axial movement of the insert and material and, if desired, with the aid of high frequency or ultrasonic vibration of the insert or the application of heat to the latter. Such inserts usually, but not necessarily, have a threaded bore or shank for receiving a threaded member such as a screw or nut and for example are widely used in components of plastics material.

This invention has reference more particularly but not exclusively to inserts of the above-mentioned kind in which at least part of the exterior of the insert is serrated by a knurling or similar tool such as the inserts set forth in the specifications of my prior British Pats. Nos. 1,230,775 and 1,326,746.

The object of this invention is to provide an improved insert of the above-mentioned kind whereby installation is facilitated.

SUMMARY OF THE INVENTION

According to the invention an insert of the kind referred to is characterized by a reduced pilot portion at the leading end of the insert having an external lip thereabout which is of less diameter than the serrated or similarly formed exterior of the insert and is provided for wall contact in the mouth of a hole for the insert in parent material in order to assist in maintaining initial axial alignment of the insert with the hole at the commencement of installation therein.

DESCRIPTION OF THE DRAWINGS

In practice the construction and arrangement is as follows, reference being had to the accompanying drawings in which.

DESCRIPTION OF THE PREFERRED EMBODIMENT

Figure 2:
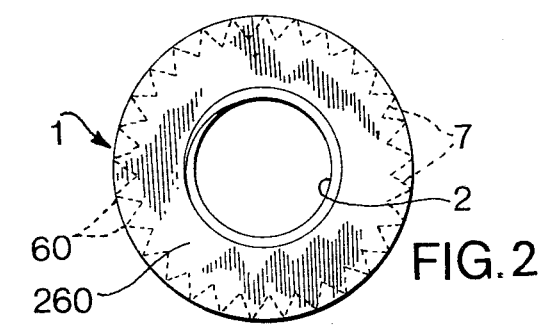
FIGS. 2 AND 3 are rear and leading end views, respectively, of the insert.
Figure 1:
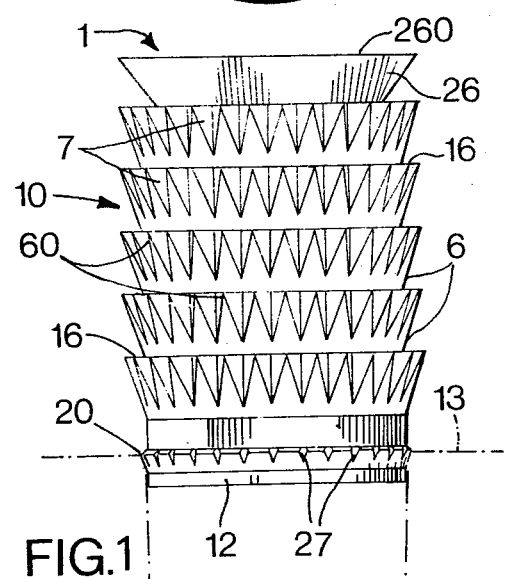
FIG. 1 is an elevation view of the insert at the commencement of installation.
Figure 4:
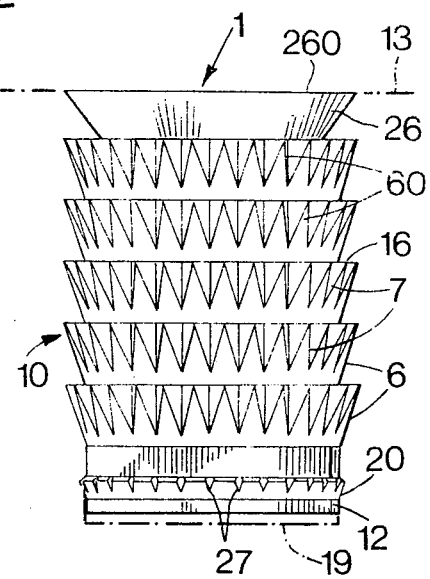
FIG. 4 is an elevational view showing the insert fully installed.
Figure 3:
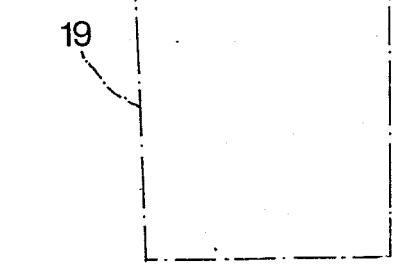
Figure 3:
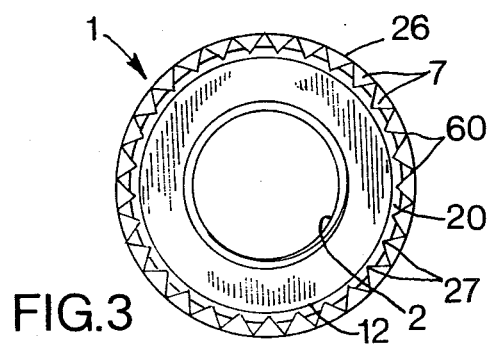

The insert shown in FIGS. 1 to 4 is basically in accordance with that described and shown in the specifications of my prior patents aforesaid in which the insert 1 is provided with a threaded bore 2 for receiving a screw and is formed on its exterior periphery at 10 with a series of taper portions 6 each of which forwardly reduce in diameter in a direction towards the leading end of the insert.

Each taper portion 6 is serrated at 7 at its rear part of greater diameter so as to provide a plurality of projections 60, the serration 7 running out with the forward reduction in diameter of the taper portion 6. Serration 7 of the taper portions 6 can be conveniently effected in practice and preferably to the V-form shown by a suitable knurling operation.

The taper portions 6 and projections 60 thereof are arranged in buttress or barbed formation so as to provide a series of shoulders 16 each defined between the rear end of one taper portion 6 and a leading end of the next portion.

The insert can be installed by a simple push operation in a hole 19 of suitable size and depth in a parent material such as metal, wood, thermo-setting or other plastic material of a component 13. Alternatively, it can be installed in thermo-plastic material with the aid of high frequency or ultrasonic vibration or by the application of heat to the insert by a thermal gun whereby the parent material immediately about the insert 1 in the hole 19 is temporarily softened or melted so as to run in relation to the insert 1 for obtaining firm securing or encapsulation of the latter in the hole after the material has solidified. Such operation may take place in only a very short interval of time, e.g., about one second or less.

During such installation the insert 1 is received by the hole 19 either by driving the insert into the latter or by moving the material relative to the insert whichever is the most convenient in practice. For the purpose of such installation and in accordance with this invention, a reduced leading end portion or pilot 12 of the insert is provided with an external lip or barb 20 shown of forwardly tapering annular form which is preferably also serrated at 27 to a shallow depth, i.e., by the same knurling tool during the serration of the taper portions 6. Thus the serration 27 of the lip 20 in a continuation or witness of the serration 7 on the taper portions 6 while it will be noted that the maximum diameter of the lip 20 is smaller than the maximum diameter of the taper portions 6 at 10.

Especially in the case of a cored hole in a plastic material, e.g., having a draft angle of the order of 3° inclusive, and on initial introduction of the insert 1 into the hole 19, the lip 20 contacts the wall of the hole at the mouth of the latter and thus assists in initially maintaining axial alignment of the insert 1 with the hole 19. This is maintained as the insert 1 is driven fully into the hole 19 where the lip 29 also provides positive location at the bottom or inner end of the hole. As a result, the tendency of the insert to pivot or rock out of axial alignment during installation is avoided or very greatly minimized.

In the case of ultrasonic installation or by means of a thermal gun, the molten parent material is able to flow over the lip 20 and about the taper portions 6 in obtaining secure installation of the insert in the hole. Owing to the buttress or barb-like formation of the taper portions 6 and projections 60, the insert 1 has a high resistance to an axial pull-out load when installed in the parent material, whilst the serration 7 of the taper portion 6 also resists the tendency of the insert to rotate relative to the parent material when the insert is under a torsional load.

The insert is also shown provided with a rear taper portion 26 of plain annular form tapering down in the same direction as the taper portions 6, i.e., towards the leading end of the insert 1.

This plain taper portion 26 is of substantially the same diameter as the taper portion 6, but the taper angle may be of the order of 45°, as against 22° of the taper portion 6. However, these and any other values quoted herein are quoted by way of example only and may be varied according to practical requirements.

The plain taper portion 26 provides an effective stop against the surface of the parent material about the mouth of the hole 19 for providing a suitable finish for aesthetic purposes and also fully closes the hole, especially as regards grooves formed in the wall of the latter by the broaching action of the serrated taper portions 6.

Again, in the case of ultrasonic or thermal gun installation, the plain taper portion 26 effectively prevents or minimizes back spew of molten plastic material from the hole 19 as the installation of the insert 1 is completed. A further practical advantage arises from the fact that the rear face 260 of the plain taper portion 26 provides a relatively large bearing surface for the horn of ultrasonic installation apparatus or of a thermal installation gun.

The foregoing features and advantages of the insert are achieved with little or no increase in the cost of manufacture or production time per insert.

Figure 5:
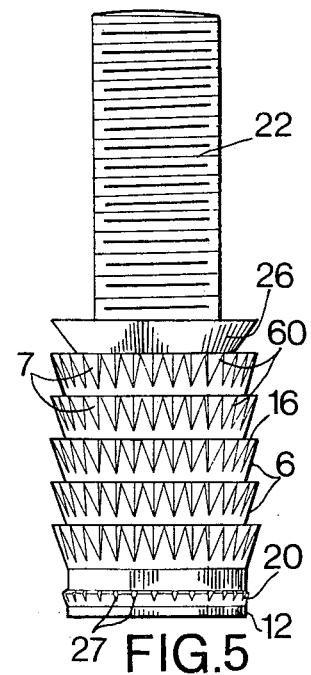
FIG. 5 is an elevational view of a male form of the insert providing a threaded stud.

FIG. 5 shows an insert body 1 having substantially the same exterior form as that described including the provision of a lip or barb 20 on the reduced pilot portion 12. However, instead of a threaded bore, the body 1 is provided with a co-axial threaded shank or stud 22 of reduced diameter extending from its rear end.

The formation of the bore 2 or shank 22 of the insert 1 depends on its intended purpose and for example may be of plain form.

I claim:

1. An insert comprising an exterior part thereof having a series of annular peripheral taper portions, each having the same diameter and each of which tapers down from a rear shoulder thereof in a direction towards the leading end of the insert so that said taper portions are in barb-like formation, each said taper portion being longitudinally serrated with serrations of V-form at its rear part to provide a plurality of projections for retention of the insert in a hole therefor in a parent material, the serrations running out with forward reduction of each taper portion; a reduced diameter cylindrical pilot portion at the leading end of the insert; an external annular lip about the pilot portion closely adjacent the leading end of said pilot portion and axially spaced along the pilot portion from the adjacent taper portion, which lip is of taper form tapering down towards the leading end of said pilot portion and is of substantially smaller diameter than that of the said series of serrated annular peripheral taper portions for wall engagement in a said hole in order to assist in maintaining initial axial alignment and contact of the insert with the hole at the commencement of and during installation of the insert therein; and a rear plain external annular peripheral taper portion behind the rearmost serrated taper portion and of substantially the same diameter thereof and also tapering down in a direction towards the leading end of the insert in order to close a said hole and retain parent material therein on complete installation of the insert.

2. An insert according to claim 1 wherein the said external annular lip is longitudinally serrated by continuation of the longitudinally serration of said series of serrated annular peripheral taper portions.

* * * * *

UNITED STATES PATENT OFFICE
CERTIFICATE OF CORRECTION

PATENT NO. : 4,046,181
DATED : September 6, 1977
INVENTOR(S) : Arthur Derrick Barnsdale It is certified that error appears in the above–identified patent and that said Letters Patent are hereby corrected as shown below:

[30] FOREIGN APPLICATION PRIORITY DATA

July 8, 1975   Great Britain................28631/75

Signed and Sealed this

Twenty-first Day of February 1978

[SEAL]

Attest:

RUTH C. MASON
Attesting Officer

LUTRELLE F. PARKER
Acting Commissioner of Patents and Trademarks